(No Model.)

T. BRABSON.
BRIDLE BIT.

No. 394,453. Patented Dec. 11, 1888.

WITNESSES:
Edward Wolff.
William L. Miller

INVENTOR:
Thomas Brabson.
BY Van Santvoord & Hauff
ATTORNEY.

UNITED STATES PATENT OFFICE.

THOMAS BRABSON, OF NEWARK, NEW JERSEY.

BRIDLE-BIT.

SPECIFICATION forming part of Letters Patent No. 394,453, dated December 11, 1888.

Application filed October 4, 1888. Serial No. 287,134. (No model.)

*To all whom it may concern:*

Be it known that I, THOMAS BRABSON, a citizen of the United States, residing at Newark, in the county of Essex and State of New Jersey, have invented new and useful Improvements in Bridle-Bits, of which the following is a specification.

This invention relates to certain improvements in bridle-bits, as pointed out in the following specification and claims, and illustrated in the accompanying drawings, in which—

Figure 1:
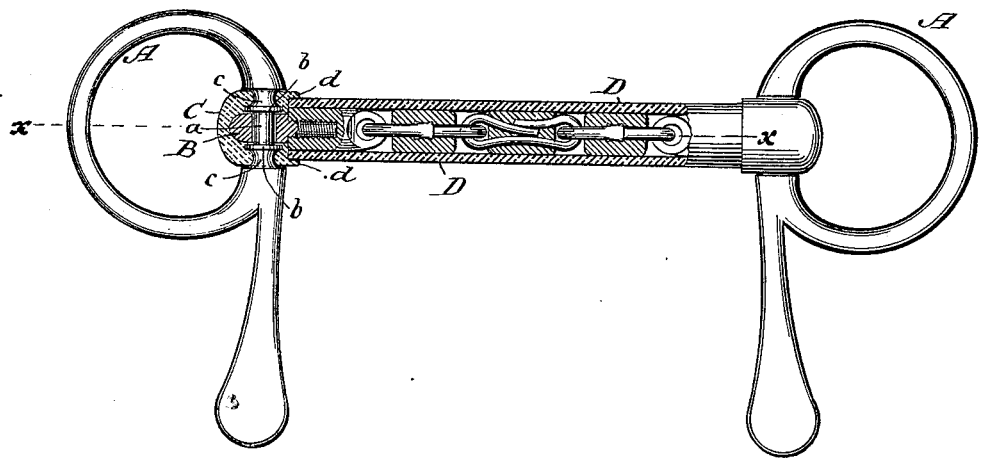
Figure 2:
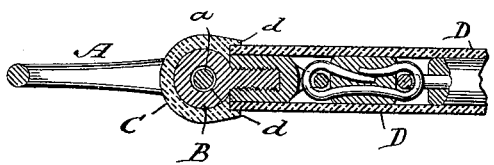

Figure 1 is a longitudinal section centrally through the mouth-piece. Fig. 2 is a similar section in the plane $x$ $x$, Fig. 1.

Similar letters indicate corresponding parts.

In the drawings, the letter A designates a bit-ring, which is cast or otherwise produced from any suitable material—such, for instance, as malleable iron. Said ring is provided with a circular bearing, $a$, between two shoulders, $b$ $b$, and this circular bearing extends through the eye of an eyebolt, B, so that this eyebolt can be freely swung round on the bearing. The eye of the eyebolt is inclosed in a head, C, of india-rubber, and in order to give to this rubber head a good hold I provide the bit-ring with circular grooves $c$ $c$ outside of the shoulders $b$ $b$. The head C is provided at its inner surface with a rim, $d$, which projects in the direction of the shank of the eyebolt.

D represents a flexible mouth-piece, which is composed of a chain and rubber covering, and when this flexible mouth-piece is secured to the eyebolts B B of the bit-rings A A, Fig. 1, the rims $d$ of the rubber heads C C overlap the rubber covering of the flexible mouth-piece and retain the same firmly in position. When the rubber covering the flexible mouth-piece is worn out, it can be readily removed and replaced by a new one without disturbing the rubber heads C C.

In the example represented in the drawings, the eyebolts B B are provided with screw-shanks to engage with the flexible mouth-piece; but the shanks of the eyebolts may be made smooth and connected to the mouth-piece by transverse pins, or other devices well known in the trade.

What I claim as new, and desire to secure by Letters Patent, is—

1. The combination, with a bit-ring having a cylindrical bearing between two shoulders, of an eyebolt which swivels on the circular bearing of the bit-ring, and an india-rubber head which covers the eye of the eyebolt, substantially as described.

2. The combination, with a bit-ring having a cylindrical bearing between two shoulders, and a circular groove on the outside of each shoulder, of an eyebolt which swivels on the circular bearing of the bit-ring, and an india-rubber head which covers the eye of the eyebolt and engages the grooves of the bit-ring, substantially as described.

3. The combination, with a bit-ring having a cylindrical bearing between two shoulders, and a circular groove on the outside of each shoulder, of an eyebolt which swivels on the circular bearing of the bit-ring, and an india-rubber head which covers the eye of the eyebolt, engages the grooves of the bit-ring, and is provided with a rim projecting beyond the eye of the eyebolt in the direction of the shank of said eyebolt, substantially as described.

In testimony whereof I have hereunto set my hand and seal in the presence of two subscribing witnesses.

THOMAS BRABSON. [L. S.]

Witnesses:
  W. C. HAUFF,
  E. F. KASTENHUBER.